US012600867B2

(12) United States Patent
Takahashi

(10) Patent No.: US 12,600,867 B2
(45) Date of Patent: Apr. 14, 2026

(54) METHOD OF COATING ARTICLE, USE FOR COATING ARTICLE, AND POLYMERIZABLE COMPOSITION

(71) Applicant: GC Corporation, Shizuoka (JP)

(72) Inventor: Makoto Takahashi, Tokyo (JP)

(73) Assignee: GC Corporation, Shizuoka (JP)

( * ) Notice: Subject to any disclaimer, the term of this patent is extended or adjusted under 35 U.S.C. 154(b) by 217 days.

(21) Appl. No.: 18/550,179

(22) PCT Filed: Jan. 21, 2022

(86) PCT No.: PCT/JP2022/002287
§ 371 (c)(1),
(2) Date: Sep. 12, 2023

(87) PCT Pub. No.: WO2022/209202
PCT Pub. Date: Oct. 6, 2022

(65) Prior Publication Data
US 2024/0166885 A1 May 23, 2024

(30) Foreign Application Priority Data
Mar. 31, 2021 (JP) ................................ 2021-062314

(51) Int. Cl.
*B05D 7/24* (2006.01)
*A01N 37/20* (2006.01)
(Continued)

(52) U.S. Cl.
CPC ............... *C09D 5/14* (2013.01); *A01N 37/20* (2013.01); *A01N 37/44* (2013.01); *A01P 1/00* (2021.08);
(Continued)

(58) Field of Classification Search
CPC .......... B05D 7/24; C09D 4/00; C09D 135/02; C09D 5/00
See application file for complete search history.

(56) References Cited

U.S. PATENT DOCUMENTS 3,909,255 A 9/1975 Levinos
4,942,112 A 7/1990 Monroe et al.
(Continued)

FOREIGN PATENT DOCUMENTS

EP 2902428 8/2015
JP H06-043634 2/1994
(Continued)

OTHER PUBLICATIONS

JP-H07316467-A English translation. (Year: 1995).*
International Search Report for PCT/JP2022/002287 mailed on Mar. 22, 2022.

*Primary Examiner* — Hai Y Zhang
(74) *Attorney, Agent, or Firm* — IPUSA, PLLC

(57) ABSTRACT

A method of coating an article includes applying a polymerizable composition onto an article, and polymerizing the polymerizable composition applied onto the article. The polymerizable composition includes a first polymerizable monomer and a solution dispersed in the first polymerizable monomer. The solution includes a first solvent and a second polymerizable monomer dissolved in the first solvent. The first polymerizable monomer is a liquid, and the second polymerizable monomer is a solid.

13 Claims, 3 Drawing Sheets

(51) Int. Cl.

| | |
|---|---|
| ***A01N 37/44*** | (2006.01) |
| ***A01P 1/00*** | (2006.01) |
| ***C08F 222/20*** | (2006.01) |
| ***C09D 4/00*** | (2006.01) |
| ***C09D 5/14*** | (2006.01) |
| ***C09D 135/02*** | (2006.01) |

(52) U.S. Cl.
CPC .............. *C08F 222/20* (2013.01); *C09D 4/00* (2013.01); *C09D 135/02* (2013.01)

(56) References Cited

U.S. PATENT DOCUMENTS

| | | | |
|---|---|---|---|
| 2003/0147932 | A1 | 8/2003 | Nun et al. |
| 2009/0233198 | A1 | 9/2009 | Kakino |
| 2011/0293542 | A1 | 12/2011 | Nikawa et al. |
| 2021/0371549 | A1 | 12/2021 | Takahashi et al. |

FOREIGN PATENT DOCUMENTS

| | | | | |
|---|---|---|---|---|
| JP | H07-316467 | | | 12/1995 |
| JP | H07316467 | A | * | 12/1995 |
| JP | H10-296895 | | | 11/1998 |
| JP | 2001-261721 | | | 9/2001 |
| JP | 2003-113003 | | | 4/2003 |
| JP | 2009-102314 | | | 5/2009 |
| JP | 2011-098976 | | | 5/2011 |
| JP | 2021-187833 | | | 12/2021 |
| WO | 2021/010154 | | | 1/2021 |

* cited by examiner

METHOD OF COATING ARTICLE, USE FOR COATING ARTICLE, AND POLYMERIZABLE COMPOSITION

TECHNICAL FIELD

The present invention relates to a method of coating an article, use for coating an article, and a polymerizable composition.

BACKGROUND ART

Considering the recently experienced COVID-19 pandemic, there has been high demand for sanitation and hygiene products having antibacterial or antiviral properties. For example, there is a technology of spreading or spraying an antiviral-agent composition including a specific silicon-containing compound on an article including an oxygen-containing functional group to fix the antiviral-agent composition on the article (for example, PTL 1).

CITATION LIST

Patent Literature

[PTL 1]
Japanese Patent No. 4830075

SUMMARY OF INVENTION

Technical Problem

According to the existing technology for imparting functions, such as antibacterial properties, antiviral properties, and the like, to articles, imparted antibacterial properties and antiviral properties do not last over a long period.

One aspect of the invention is to provide a method of coating an article, which achieves long-term retention of antibacterial properties and antiviral properties.

Solution to Problem

One aspect of the present invention is a method of coating an article. The method includes: applying a polymerizable composition onto an article; and polymerizing the polymerizable composition applied onto the article. The polymerizable composition includes a first polymerizable monomer and a solution dispersed in the first polymerizable monomer. The solution includes a first solvent and a second polymerizable monomer dissolved in the first solvent. The first polymerizable monomer is a liquid, and the second polymerizable monomer is a solid.

Advantageous Effects of Invention

According to one aspect of the present invention, a method of coating an article, which achieves long-term retention of antibacterial properties and antiviral properties, can be provided.

DESCRIPTION OF EMBODIMENTS

Figure 1:
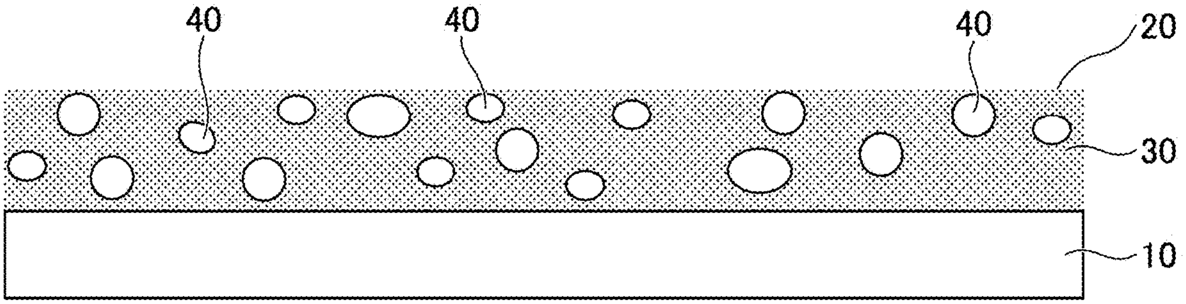
FIG. 1 is a schematic view illustrating a cross-section of the polymerizable composition of the present embodiment.

Next, embodiments for carrying out the present invention will be described.

<Method of Coating Article>

The method of coating an article according to the present embodiment includes applying a polymerizable composition onto an article, and polymerizing the polymerizable composition applied onto the article. In the present specification, the coating encompasses covering a surface of an article with the polymerizable composition.

In the present specification, the article is a subject to which the polymerizable composition is applied. The material of the article (subject) is not particularly limited. The polymerizable composition can be applied to various materials, such as metals, ceramics, plastics, wood, fibers, and the like. Moreover, the coating also includes a case where the polymerizable composition is fixed or adhered on a surface of an article, part of which remains exposed, without completely covering the surface of the article with the polymerizable composition.

In terms of the application of the polymerizable composition onto the article, the application is preferably spraying, jetting, or spreading. The spraying encompasses ejecting a liquid in the state of a mist. The jetting encompasses ejecting a liquid linearly. The spreading encompasses spreading or painting a liquid.

In the case where the application is spraying or jetting, for example, a spray can (or a spray container) is filled with the polymerizable composition (may be also referred to as a coating liquid or coating agent hereinafter), and the polymerizable composition can be sprayed from a nozzle a spout angle of which is adjusted. In the case where a spray container is used, the spray container is shaken before use, if necessary, so that the coating liquid contained therein is stirred, and the spray container is used after stirring the coating liquid therein.

In the case where the application is spreading, the polymerizable composition is spread on a surface of an article (subject) by an applicator, such as a flat brush, a round brush, and the like.

Moreover, a volatile solvent may be added to the coating liquid to reduce the viscosity of the coating liquid. If the coating agent is cured with the volatile solvent remaining therein, a mechanical strength of a resulting cured product is reduced. In the case where the volatile solvent is added, therefore, curing is ideally performed after evaporating the volatile solvent.

In the method of coating an article according to the present embodiment, the application of the polymerizable composition onto an article is carried out by spraying, jetting, or spreading, thus a process of fixing the polymerizable composition on a surface of an article is easily carried out.

In the polymerization of the polymerizable composition applied onto the article, the polymerizable composition is polymerized and cured on the surface of the article to fix the polymerizable composition on the article in the cured state. An embodiment of the polymerization of the polymerizable composition is not particularly limited. For the polymerization, for example, sequential polymerization, chain polymerization, a combination of sequential polymerization and chain polymerization, or the like may be used.

The polymerization of the polymerizable composition applied onto the article preferably includes performing light irradiation on the polymerizable composition applied onto the article. In the performing of light irradiation on the polymerizable composition applied onto the article, the polymerizable composition applied onto the article is polymerized and cured by light irradiation to form a cured product (or a cured body), and the cured product of the polymerizable composition is fixed on the article.

The light irradiation is, for example, to irradiate the polymerizable composition with electromagnetic waves in the wavelength range of 350 nm to 500 nm. Within the electromagnetic waves in the wavelength range of 350 nm to 450 nm, the electromagnetic waves having wavelengths of 380 nm or shorter are ultraviolet rays, and the electromagnetic waves having wavelengths of longer than 380 nm are visible rays.

Since the polymerization of the polymerizable composition includes performing light irradiation on the polymerizable composition applied onto the article in the method of coating an article according to the present embodiment, polymerization of the polymerizable composition is accelerated at the surface of the article, and the curing time of the polymerizable composition can be shortened. As a result of the light irradiation, moreover, the polymerization curing of the polymerizable composition is efficiently progressed, and stability of the polymerizable composition fixed on the article can be enhanced.

In the method of coating an article according to the present embodiment, the polymerizable composition applied onto the article includes a first polymerizable monomer, and a solution dispersed in the first polymerizable monomer, where the solution includes a first solvent and a second polymerizable monomer dissolved in the first solvent. The above-described polymerizable composition can be obtained, for example, by mixing the first polymerizable monomer, the second polymerizable monomer, and the first solvent (referred to as a mixing step hereinafter).

Regarding the polymerizable composition used for the method of coating an article according to the present embodiment, the first polymerizable monomer is a liquid, and the second polymerizable monomer is a solid. For example, the first polymerizable monomer is present as a liquid at 25° C. and $1.01\times10^5$ Pa (referred to as ambient temperature and ambient pressure), and the second polymerizable monomer is present as a solid at ambient temperature and ambient pressure.

If the first polymerizable monomer and the second polymerizable monomer are mixed without the first solvent, the second polymerizable monomer cannot be homogeneously distributed in the first polymerizable monomer because it is difficult to control particle diameters of the second polymerizable monomer. In this case, the appearance of the polymerizable composition cured on the article is impaired. In addition, functions (or performance) derived from the second polymerizable monomer are not desirably imparted to the article, or even if the functions are imparted, the long-term retention of the functions cannot be achieved.

If the first polymerizable monomer, the second polymerizable monomer, and the first solvent are used, on the other hand, the second polymerizable monomer can be homogeneously distributed in the polymerizable composition. In the method of coating an article according to the present embodiment, therefore, the appearance of the cured body of the polymerizable composition cured on the article can be improved, the functions (or performance) derived from the second polymerizable monomer can be imparted to the article, and the functions can last for a long period.

In the case where the second polymerizable monomer includes a functional group exhibiting antibacterial properties (referred to as an antibacterial group hereinafter), for example, antibacterial properties can be imparted to the cured body of the polymerizable composition. In the case where the second polymerizable monomer includes a functional group exhibiting antiviral properties (referred to as an antiviral group hereinafter), moreover, antiviral properties can be imparted to the cured body of the polymerizable composition.

The mass ratio of the first solvent to the second polymerizable monomer is preferably from 0.01 to 5, more preferably from 0.1 to 2. If the mass ratio of the first solvent to the second polymerizable monomer is 0.01 or greater, stability is improved when the second polymerizable monomer is dissolved in the first solvent. If the mass ratio of the first solvent to the second polymerizable monomer is 5 or less, the mechanical strength of the cured body of the polymerizable composition is improved.

A mass ratio of the first polymerizable monomer to the sum of the second polymerizable monomer and the first solvent is preferably from 0.1 to 100, more preferably from 0.5 to 50. If the mass ratio of the first polymerizable monomer to the sum of the second polymerizable monomer and the first solvent is 0.1 or greater, the mechanical strength of the cured body of the polymerizable composition is improved. If the mass ratio of the first polymerizable monomer to the sum of the second polymerizable monomer and the first solvent is 100 or less, the cured body of the polymerizable composition has the improved performance derived from the second polymerizable monomer.

In the mixing step of the polymerizable composition used for the method of coating an article according to the present embodiment, a surfactant may be added at the time when the first polymerizable monomer, the second polymerizable monomer, and the first solvent are mixed.

The surfactant is not particularly limited, except that the surfactant can improve dispersibility of a solution. Examples of the surfactant include sodium lauryl sulfate, glycerin fatty acid esters, and the like. One of the above surfactants may be used alone, or two or more of the above surfactants may be used in combination.

In the mixing step, at the time when the first polymerizable monomer, the second polymerizable monomer, and the first solvent are mixed, other components, such as a photoinitiator, tertiary amines, a polymerization inhibitor, and the like, are preferably added, followed by kneading the resulting mixture.

In the case where the polymerizable composition is applied by jetting or spraying, other components are preferably substantially free from fillers so as not to cause clogging of a nozzle. In the present specification, "substantially free from" means that components, such as fillers and the like, are intentionally excluded from the formulation. The components, from which the polymerizable composition is substantially free, may be included in the polymerizable composition as inevitable impurities. The content of the components included as inevitable impurities is preferably less than 1% by mass.

In the mixing step, at the time when the first polymerizable monomer, the second polymerizable monomer, and the first solvent are mixed, glass and/or pigments may be added as other components to improve the mechanical strength or to reduce transparency of the polymerizable composition coated on the article.

In the mixing step of the polymerizable composition performed in the method of coating an article according to the present embodiment, a second solvent may be added to the polymerizable composition, which is to be a coating liquid, to reduce the viscosity of the coating liquid, in consideration of preventing poor workability of the polymerizable composition serving as the coating liquid. If the polymerizable composition is cured with the second solvent remaining therein, the mechanical strength of the cured product of the polymerizable composition is decreased. Therefore, the polymerizable composition is preferably cured by light irradiation after evaporating the second solvent.

Other components may be added to the first polymerizable monomer, the second polymerizable monomer, and/or the first solvent before mixing the first polymerizable monomer, the second polymerizable monomer, and the first solvent in the mixing step. Moreover, other components may be added after mixing the first polymerizable monomer, the second polymerizable monomer, and the first solvent in the mixing step.

The mixing step may include dissolving the second polymerizable monomer in the first solvent to prepare a solution, and mixing the solution with the first polymerizable monomer.

As the solution, in which the second polymerizable monomer is dissolved in the first solvent, is mixed with the first polymerizable monomer, the second polymerizable monomer can be more homogeneously dispersed in the polymerizable composition. As a result, the appearance of the cured body of the polymerizable composition can be improved, as well as imparting a function or performance derived from the second polymerizable monomer to the cured body of the polymerizable composition, and the long-term retention of the functions (or performance) derived from the second polymerizable monomer can be improved.

For example, in the case where the second polymerizable monomer includes an antibacterial group, as well as imparting antibacterial properties to the cured body of the polymerizable composition, the appearance of the cured body of the polymerizable composition and the long-term retention of the functions (or performance) derived from the second polymerizable monomer can be improved further.

In the case where the second polymerizable monomer includes an antiviral group, moreover, as well as imparting antiviral properties to the cured body of the polymerizable composition, the appearance of the cured body of the polymerizable composition and the long-term retention of the functions (or performance) derived from the second polymerizable monomer can be improved further.

In the case where the first solvent is water, moreover, the second polymerizable may be allowed to absorb the moisture in the atmosphere to dissolve the second polymerizable monomer with the water of the atmosphere.

Examples of the method of mixing the solution, in which the second polymerizable monomer is dissolved in the first solvent, with the first polymerizable monomer include: a method of kneading the solution and the first polymerizable monomer using a planetary centrifugal mixer; a method of mixing the solution and the first polymerizable monomer using a magnetic stirrer; a method of mixing the solution and the first polymerizable monomer by a stirring device equipped with a stirring blade; and the like.

In the mixing step, a surfactant may be added or may not be added at the time when the solution and the first polymerizable monomer are mixed.

The surfactant is not particularly limited, except that the surfactant can improve dispersibility of the solution. Examples of the surfactant include sodium lauryl sulfate, glycerin fatty acid esters, and the like. One of the above surfactants may be used alone, or two or more of the above-surfactants may be used in combination.

In the mixing step of the polymerizable composition performed in the method of coating an article according to the present embodiment, at the time when the solution, in which the second polymerizable monomer is dissolved in the first solvent, and the first polymerizable monomer are mixed, other components, such as a photoinitiator, tertiary amines, a polymerization inhibitor, and the like, are preferably added, followed by kneading the resulting mixture.

Other components may be added to the solution and/or the first polymerizable monomer before mixing. Moreover, other components may be added after mixing the solution and the first polymerizable monomer.

The mixing step may include: dissolving at least part of the first polymerizable monomer and the second polymerizable monomer in a second solvent to prepare a solution; removing the second solvent from the solution to prepare a dispersion liquid, in which the second polymerizable monomer is dispersed in the at least part of the first polymerizable monomer; and mixing the dispersion liquid and the first solvent.

As the dispersion liquid, in which the second polymerizable monomer is dispersed in the first polymerizable monomer, is mixed with the first solvent in the mixing step, the second polymerizable monomer can be more homogeneously distributed in the polymerizable composition. As a result, as well as imparting functions derived from the second polymerizable monomer to the cured body of the polymerizable composition, the appearance of the cured body of the polymerizable composition and the long-term retention of the functions (or performance) derived from the second polymerizable monomer can be improved further.

For example, in the case where the second polymerizable monomer includes an antibacterial group, as well as imparting antibacterial properties to the cured body of the polymerizable composition, the appearance of the cured body of the polymerizable composition and the long-term retention of the functions (or performance) derived from the second polymerizable monomer can be improved further.

In the case where the second polymerizable monomer includes an antiviral group, moreover, as well as imparting antiviral properties to the cured body of the polymerizable composition, the appearance of the cured body of the polymerizable composition and the long-term retention of the functions (or performance) derived from the second polymerizable monomer can be improved further.

In the case where part of the first polymerizable monomer is used to prepare the solution, after preparing the dispersion liquid, the dispersion liquid and the remaining first polymerizable monomer are mixed. The timing for mixing the dispersion liquid and the remaining first polymerizable monomer is not particularly limited, but the remaining first polymerizable monomer is preferably mixed at the time when the dispersion liquid and the first solvent are mixed.

In the course of the preparation of the solvent, the mass ratio of the second polymerizable monomer to at least part of the first polymerizable monomer is preferably from 0.01 to 100, more preferably from 0.05 to 50. When the mass ratio between the first polymerizable monomer and the second polymerizable monomer is from 0.01 to 100, the dispersion liquid that is obtained by removing the second solvent from the solution achieves a desirable dispersion state.

Examples of the method of mixing the dispersion liquid and the first solvent include: a method of stirring the dispersion liquid and the first solvent; a method of mixing the dispersion liquid and the first solvent using a magnetic stirrer; a method of mixing the dispersion liquid and the first solvent using a stirring device equipped with a stirring blade; and the like.

In the mixing step of the polymerizable composition performed in the method of coating an article according to the present embodiment, a surfactant may be added at the time when the dispersion liquid and the first solvent are mixed.

The surfactant is not particularly limited, except that the surfactant can improve dispersibility of the solution. Examples of the surfactant include sodium lauryl sulfate, glycerin fatty acid esters, and the like. One of the above surfactants may be used alone, or two or more of the above surfactants may be used in combination.

In the mixing step, after mixing the dispersion liquid and the first solvent, other components, such as a photoinitiator, tertiary amines, a polymerization inhibitor, and the like, are preferably added, followed by kneading the resulting mixture.

Other components may be added to the dispersion liquid and/or the first solvent before mixing. Moreover, other components may be added at the time when the dispersion liquid and the first solvent are mixed.

<First Polymerizable Monomer>

The first polymerizable monomer is insoluble in the first solvent.

The first polymerizable monomer is preferably (meth) acrylate, more preferably polyfunctional (meth)acrylate including two or more (meth)acryloyloxy groups.

Examples of the first polymerizable monomer include ethoxylated bisphenol A dimethacrylate, neopentyl glycol dimethacrylate, urethane dimethacrylate, glycerol dimethacrylate, triethylene glycol dimethacrylate, tricyclodecane dimethanol dimethacrylate, and the like. One of the above first polymerizable monomers may be used alone, or two or more of the above first polymerizable monomers may be used in combination.

The content of the first polymerizable monomer used for the method of coating an article of the present embodiment is not particularly limited. For example, the content of the first polymerizable monomer is preferably 1% by mass or greater and 99.9% by mass or less, more preferably 1.5% by mass or greater and 79% by mass or less, and yet more preferably 2% by mass or greater and 49% by mass or less.

If the content of the first polymerizable monomer in the polymerizable composition is 1% by mass or greater, the mechanical strength of the cured product of the polymerizable composition is improved. If the content of the first polymerizable monomer is 99.9% by mass or less, the cured product of the polymerizable composition has improved functions or performance derived from the second polymerizable monomer.

<Second Polymerizable Monomer>

The second polymerizable monomer is soluble in the first solvent, but is insoluble in the first polymerizable monomer.

The second polymerizable monomer is preferably (meth) acrylate, more preferably monofunctional (meth)acrylate including one (meth)acryloyloxy group.

The second polymerizable monomer preferably has a functional group exhibiting either antibacterial properties or antiviral properties, or both. The functional group exhibiting either antibacterial properties or antiviral properties, or both, encompasses a case where one functional group exhibits both antibacterial properties and antiviral properties, and a case where one functional group is either an antibacterial group or an antiviral group. Moreover, the functional group exhibiting antibacterial properties and antiviral properties also encompasses a case where the second polymerizable monomer includes a functional group exhibiting antibacterial properties and a functional group exhibiting antiviral properties.

The functional group exhibiting either antibacterial properties or antiviral properties, or both, is not particularly limited. Examples of the functional group exhibiting either antibacterial properties or antiviral properties, or both, include quaternary ammonium salt groups and the like. The quaternary ammonium salt groups can function as antiviral groups, as well as functioning as antibacterial groups.

Examples of the second polymerizable monomer including the functional group exhibiting either antibacterial properties or antiviral properties, or both, include: monofunctional polymerizable monomers, such as 2-(methacryloyloxy)ethyltrimethylammonium chloride, (3-acrylamidepropyl)trimethylammonium chloride, (2-(acryloyloxy)ethyl)trimethylammonium chloride, N-(2-acryloyloxyethyl)-N-benzyl-N,N-dimethylammonium chloride, a dimethylaminopropyl acrylamide methyl chloride quaternary salt, a dimethylaminoethyl acrylate methyl chloride quaternary salt, a dimethylaminoethyl acrylate benzyl chloride quaternary salt, and the like; and polyfunctional monomers, such as a diallyl quaternary ammonium salt (e.g., diallyldimethylammonium chloride, diallyldiethylammonium chloride, etc.), a compound represented by the following chemical formula, and the like.

[Chem. 1]

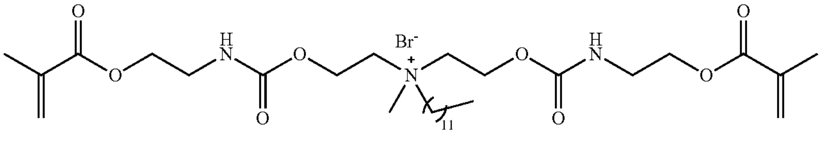

One of the above second polymerizable monomers including the functional group exhibiting either antibacterial properties or antiviral properties, or both, may be used alone, or two or more of the above second polymerizable monomers including the functional group exhibiting either antibacterial properties or antiviral properties, or both, may be used in combination.

Examples of the second polymerizable monomer including neither an antibacterial group nor an antiviral group include phenoxyethylene glycol methacrylate, dimethylaminoethyl methacrylate, and the like.

One of the above second polymerizable monomers including neither an antibacterial group nor an antiviral group may be used alone, or two or more of the above second polymerizable monomers including neither an antibacterial group nor an antiviral group may be used in combination.

The content of the second polymerizable monomer in the polymerizable composition is not particularly limited. For example, the content of the second polymerizable monomer in the polymerizable composition is preferably 0.01% by mass or greater and 99% by mass or less, more preferably 0.02% by mass or greater and 79% by mass or less, and yet more preferably 0.03% by mass or greater and 49% by mass or less.

If the content of the second polymerizable monomer in the polymerizable composition is 0.01% by mass or greater, the functions or performance of the cured product of the polymerizable composition derived from the second polymerizable monomer is improved. If the content of the second polymerizable monomer in the polymerizable composition is 99% by mass or less, the mechanical strength of the cured body of the polymerizable composition is improved.

<First Solvent>

Examples of the first solvent include water, glycerin, propylene glycol, ethylene glycol, polyethylene glycol having an average molecular weight of 1,200 or less, butylene glycol, and the like. One of the above first solvents may be used alone, or two or more of the above first solvents may be used in combination.

The content of the first solvent in the polymerizable composition is not particularly limited. For example, the content of the first solvent in the polymerizable composition is preferably 0.01% by mass or greater and 40% by mass or less, more preferably 0.02% by mass or greater and 35% by mass or less, and yet more preferably 0.03% by mass or greater and 30% by mass or less.

If the content of the first solvent in the polymerizable composition of the present embodiment is 0.01% by mass or greater, the function or performance of the cured body of the polymerizable composition derived from the second polymerizable monomer is improved. If the content of the first solvent in the polymerizable composition of the present embodiment is 40% by mass or less, the mechanical strength of the cured body of the polymerizable composition is improved.

<Second Solvent>

Examples of the second solvent include organic solvents (e.g., ethanol, acetone, hexane, etc.) and the like. One of the above second solvents may be used alone, or two or more of the above second solvents may be used in combination.

The content of the second solvent in the solution is not particularly limited. For example, the content of the second solvent in the solution is preferably 10% by mass or greater and 99% by mass or less. If the content of the second solvent in the solution is 10% by mass or greater, the stability of the solubility of the polymerizable monomers is improved. If the content of the second solvent in the solution is 99% by mass or less, the second solvent is easily removed from the solution.

<Photoinitiator>

Examples of the photoinitiator include camphorquinone, phenylbis(2,4,6-trimethylbenzoyl)phosphine oxide, 2,4,6-trimethylbenzoyldiphenyl phosphine oxide, benzyl ketal, diacetyl ketal, benzyl dimethyl ketal, benzyl diethyl ketal, benzyl bis(2-methoxyethyl)ketal, 4,4'-dimethyl(benzyldimethylketal), anthraquinone, 1-chloroanthraquinone, 2-chloroanthraquinone, 1,2-benzanthraquinone, 1-hydroxyanthraquinone, 1-methylanthraquinone, 2-ethylanthraquinone, 1-bromoanthraquinone, thioxanthone, 2-isopropylthioxanthone, 2-nitrothioxanthone, 2-methylthioxanthone, 2,4-dimethylthioxanthone, 2,4-diethylthioxanthone, 2,4-diisopropyithioxanthone, 2-chloro-7-trifluoromethylthioxanthone, thioxanthone-10,10-dioxide, thioxanthone-10-oxide, benzoin methyl ether, benzoin ethyl ether, benzoin isopropyl ether, benzoin isobutyl ether, benzophenone, bis(4-dimethylaminophenyl)ketone, 4,4'-bis(diethylamino)benzophenone, and the like. One of the above photoinitiators may be used alone, or two or more of the above photoinitiators may be used in combination.

<Tertiary Amines>

The tertiary amines may be tertiary aliphatic amines or tertiary aromatic amines. The tertiary amines are preferably tertiary aromatic amines, more preferably alkyl p-dialkylaminobenzoate.

Examples of the tertiary aliphatic amines include N,N-dimethylaminoethyl methacrylate, triethanolamine, and the like.

Examples of the alkyl p-dialkylaminobenzoate include methyl p-dimethylaminobenzoate, ethyl p-dimethylaminobenzoate, propyl p-dimethylaminobenzoate, amyl p-dimethylaminobenzoate, isoamyl p-dimethylaminobenzoate, ethyl p-diethylaminobenzoate, propyl p-diethylaminobenzoate, and the like.

Examples of the tertiary amines other than the alkyl p-dialkylaminobenzoate include 7-dimethylamino-4-methylcoumarin, N,N-dimethylaniline, N,N-dibenzylaniline, N,N-dimethyl-p-toluidine, N,N-diethyl-p-toluidine, N,N-bis(2-hydroxyethyl)-p-toluidine, N,N,2,4,6-pentamethylaniline, N,N,2,4-tetramethylaniline, N,N-diethyl-2,4,6-trimethylaniline, and the like.

One of the above tertiary amines may be used alone, or two or more of the above tertiary amines may be used in combination.

<Polymerization Inhibitor>

Examples of the polymerization inhibitor include dibutylhydroxytoluene (Synonym: 2,6-di-tert-butyl-p-cresol), 6-tert-butyl-2,4-xylenol, and the like. One of the above polymerization inhibitors may be used alone, or two or more of the above polymerization inhibitors may be used in combination.

<Use of Polymerizable Composition for Coating Article>

Use of a polymerizable composition for coating an article according to the present embodiment is use of the following polymerizable composition for coating an article. The polymerizable composition includes a first polymerizable monomer, in which a solution is dispersed. The solution includes a first solvent and a second polymerizable monomer dissolved in the first solvent. The first polymerizable monomer is a liquid, and the second polymerizable monomer is a solid.

An embodiment of the use of the polymerizable composition according to the present embodiment is not particularly limited. For example, an embodiment of the use of the polymerizable composition is the above-described method of coating an article. Specifically, the method of coating an article, including applying a polymerizable composition onto an article, and polymerizing the polymerizable composition applied onto the article, is one embodiment of the use of the polymerizable composition for coating an article according to the present embodiment.

The first polymerizable monomer used in the above-described method of coating an article can be used as the first polymerizable monomer in the use of the polymerizable composition according to the present embodiment. Moreover, the second polymerizable monomer used in the above-described method of coating an article can be used as the second polymerizable monomer in the use of the polymerizable composition according to the present embodiment. Furthermore, the first solvent used in the above-described method of coating an article can be used as the first solvent in the use of the polymerizable composition according to the present embodiment.

Since the first polymerizable monomer, the second polymerizable monomer, and the first solvent used in the above-described method of coating an article are used in the use of the polymerizable composition for coating an article according to the present embodiment, the same effects as obtained in the above-described method of coating an article can be obtained.

Specifically, as the first polymerizable monomer, the second polymerizable monomer, and the first solvent are used, the second polymerizable monomer can be homogeneously distributed in the polymerizable composition. Therefore, the use of the polymerizable composition according to the present embodiment can improve the appearance of the cured body of the polymerizable composition cured on the article, and as well as imparting functions (or performance) derived from the second polymerizable monomer to the article, the functions can last for a long period.

In the use of the polymerizable composition of the present embodiment, the second polymerizable monomer preferably includes a functional group exhibiting either antibacterial properties or antiviral properties, or both. As the second polymerizable monomer including a functional group exhibiting either antibacterial properties or antiviral properties, or both, the second polymerizable monomer including an antibacterial group and/or antiviral group used in the above-described method of coating an article can be used.

Specifically, a quaternary ammonium salt group and the like used in the above-described method of coating an article can be used as the antibacterial group and/or the antiviral group used in the second polymerizable monomer.

Since the second polymerizable monomer includes an antibacterial group and/or antiviral group in the use of the polymerizable composition according to the present embodiment, in the case where the second polymerizable monomer includes an antibacterial group, antibacterial properties can be imparted to the cured body of the polymerizable composition as the function derived from the second polymerizable monomer. In the case where the second polymerizable monomer includes an antiviral group, moreover, antiviral properties can be imparted to the cured body of the polymerizable composition as the function derived from the second polymerizable monomer.

<Polymerizable Composition>

The polymerizable composition of the present embodiment is a polymerizable composition used to coat an article. The polymerizable composition includes a first polymerizable monomer, in which a solution is dispersed, where the solution includes a first solvent and a second polymerizable monomer dissolved in the first solvent. The first polymerizable monomer is a liquid, and the second polymerizable monomer is a solid.

The polymerizable composition according to the present embodiment is not particularly limited. For example, the polymerizable composition used in the above-described method of coating an article may be used as it is.

As the first polymerizable monomer used in the polymerizable composition of the present embodiment, the first polymerizable monomer used in the above-described method of coating an article can be used. Moreover, the content of the first polymerizable monomer in the polymerizable composition can be same as the content of the first polymerizable monomer used in the above-described method of coating an article.

As the second polymerizable monomer used in the polymerizable composition of the present embodiment, moreover, the second polymerizable monomer used in the above-described method of coating an article can be used. Moreover, the content of the second polymerizable monomer in the polymerizable composition can be the same content of the second polymerizable monomer used in the above-described method of coating an article.

As the first solvent used in the polymerizable composition of the present embodiment, furthermore, the first solvent used in the above-described method of coating an article may be used. Moreover, the content of the first solvent in the polymerizable composition can be the same content of the first solvent used in the above-described method of coating an article.

In a similar manner as the polymerizable composition used in the above-described method of coating an article, the polymerizable composition of the present embodiment may include a second solvent and a surfactant. The content of the second solvent in the polymerizable composition can be the same content of the second solvent used in the above-described method of coating an article. Moreover, the content of the surfactant in the polymerizable composition can be the same content of the surfactant used in the above-described method of coating an article.

In a similar manner as the polymerizable composition used in the above-described method of coating an article, the polymerizable composition of the present embodiment may include other components, such as a photoinitiator, tertiary amines, a polymerization inhibitor, and the like.

Since the first polymerizable monomer, the second polymerizable monomer, and the first solvent used in the above-described method of coating an article are used in the polymerizable composition of the present embodiment, the same effects as obtained in the above-described method of coating an article can be obtained.

Specifically, as the first polymerizable monomer, the second polymerizable monomer, and the first solvent are used, the second polymerizable monomer can be homogeneously distributed in the polymerizable composition. Therefore, the polymerizable composition of the present embodiment can improve the appearance of the cured body of the polymerizable composition cured on the article, and as well as imparting functions (or performance) derived from the second polymerizable monomer to the article, the functions can last for a long period.

In the polymerizable composition of the present embodiment, the second polymerizable monomer preferably includes a functional group exhibiting either antibacterial properties or antiviral properties, or both. As the second polymerizable monomer including a functional group exhibiting either antibacterial properties or antiviral properties, or both, the second polymerizable monomer including an antibacterial group and/or antiviral group used in the above-described method of coating an article can be used.

Specifically, a quaternary ammonium salt group and the like used in the above-described method of coating an article can be used as the antibacterial group and/or the antiviral group used in the second polymerizable monomer.

Since the second polymerizable monomer includes an antibacterial group and/or antiviral group in the polymerizable composition according to the present embodiment, in the case where the second polymerizable monomer includes an antibacterial group, antibacterial properties can be imparted to the cured body of the polymerizable composition as the functions derived from the second polymerizable monomer. In the case where the second polymerizable monomer includes an antiviral group, moreover, antiviral properties can be imparted to the cured body of the polymerizable composition as the functions derived from the second polymerizable monomer.

Use of the polymerizable composition of the present embodiment is not particularly limited, except that the polymerizable composition is used to coat an article. For example, the polymerizable composition of the present embodiment is used to impart performance, such as antibacterial properties, antiviral properties, and the like, to an article. Moreover, the material of an article to which the polymerizable composition of the present embodiment is applied is not particularly limited. The polymerizable composition can be applied to various materials, such as metals, ceramics, plastics, wood, fibers, and the like.

EXAMPLE

Hereinafter, examples of the present invention will be described, but the present invention is not limited to the examples. In the following, numerical values expressed without units or "%" are all on a mass basis (% by mass), unless otherwise stated.

Example 1

After adding 4 g of 2-(methacryloyloxy)ethyltrimethylammonium chloride (referred to as MTMAC hereinafter) serving as a second polymerizable monomer and 1 g of distilled water serving as a first solvent to a bottle with a lid, the mixture was stirred by a stirrer to prepare an MTMAC aqueous solution.

After mixing 14 g of ethoxylated bisphenol A dimethacrylate (referred to as BisMEPP hereinafter) and 12 g of neopentyl glycol dimethacrylate (referred to as NPG hereinafter), both serving as a first polymerizable monomer, 0.04 g of (±)-camphorquinone, 0.1 g of ethyl p-dimethylaminobenzoate, and 4 g of the MTMAC aqueous solution were added. The resulting mixture was stirred by a planetary centrifugal mixer at 1,000 rpm for 10 minutes to prepare a coating liquid.

The coating liquid was poured into a spray container, then the coating liquid was evenly sprayed onto an acrylic plate of 5 cm×5 cm with a thickness of 5 mm. The sprayed coating liquid was irradiated with light for 5 minutes by an LED that emitted light having wavelengths of from 365 nm to 465 nm at radiation intensity of 1,200 mW/$cm^2$ to polymerize the coating liquid, to thereby prepare a coated test piece.

FIG. 1 illustrates a state after evenly spraying the coating liquid onto the acrylic plate, but before light irradiation by the LED in Example 1.

Example 2

After adding 16 g of MTMAC and 4 g of distilled water to a bottle with a lid, the mixture was stirred by a stirrer to prepare an MTMAC aqueous solution.

After mixing 18 g of BisMEPP and 14 g of NPG, 0.04 g of (±)-camphorquinone, 0.1 g of ethyl p-dimethylaminobenzoate, and 14 g of the MTMAC aqueous solution were added. The resulting mixture was stirred by a planetary centrifugal mixer at 1,000 rpm for 10 minutes to prepare a coating liquid.

A coated test piece was obtained in the same manner as in Example 1, except that the obtained coating liquid was used.

Example 3

After adding 4 g of MTMAC and 1 g of distilled water to a bottle with a lid, the mixture was stirred by a stirrer to prepare an MTMAC aqueous solution.

After mixing 15 g of BisMEPP and 14 g of NPG, 0.04 g of (±)-camphorquinone, 0.1 g of ethyl p-dimethylaminobenzoate, and 1 g of the MTMAC aqueous solution were added. The resulting mixture was stirred by a planetary centrifugal mixer at 1,000 rpm for 10 minutes to prepare a coating liquid.

A coated test piece was obtained in the same manner as in Example 1, except that the obtained coating liquid was used.

Example 4

After weighing MTMAC on a weighing dish by 4 g, the weighed MTMAC was left to stand in the atmosphere having the temperature of 23° C. and relative humidity of 50% for 3.5 hours so that the MTMAC was allowed to absorb the moisture (water vapor) in the atmosphere to prepare an MTMAC aqueous solution. After the absorption of the mixture, the mass of the weighing dish was increased by 1 g. A coated test piece was obtained in the same manner as in Example 1, except that the obtained MTMAC aqueous solution was used.

Example 5

After adding 5 g of MTMAC and 5 g of glycerin to a bottle with a lid, the mixture was stirred by a stirrer to prepare a MTMAC glycerin solution.

A coated test piece was obtained in the same manner as in Example 1, except that the MTMAC glycerin solution was used instead of the MTMAC aqueous solution.

Example 6

After adding 5 g of MTMAC and 5 g of propylene glycol to a bottle with a lid, the mixture was stirred by a stirrer to prepare a MTMAC propylene glycol solution.

After mixing 14 g of BisMEPP and 12 g of NPG, 0.04 g of (±)-camphorquinone, 0.1 g of ethyl p-dimethylaminobenzoate, 0.02 g of sodium dodecyl sulfate (referred to as SDS hereinafter) serving as a surfactant, and 4 g of the MTMAC propylene glycol solution were added. The resulting mixture was stirred by a planetary centrifugal mixer at 1,000 rpm for 10 minutes to prepare a coating liquid.

A coated test piece was obtained in the same manner as in Example 1, except that the obtained coating liquid was used.

Example 7

After adding 4 g of (3-acrylamidopropyl)trimethylammonium chloride (referred to as AATMAC hereinafter) serving as a second polymerizable monomer and 1 g of distilled water to a bottle with a lid, the mixture was stirred by a stirrer to prepare an AATMAC aqueous solution.

A coated test piece was obtained in the same manner as in Example 1, except that the AATMAC aqueous solution was used instead of the MTMAC aqueous solution.

Example 8

After adding 4 g of (2-(acryloyloxy)ethyl)trimethylammonium chloride (referred to as ATMAC hereinafter) serving as a second polymerizable monomer and 1 g of distilled water to a bottle with a lid, the mixture was stirred by a stirrer to prepare an ATMAC aqueous solution.

A coated test piece was obtained in the same manner as in Example 1, except that the ATMAC aqueous solution was used instead of the MTMAC aqueous solution.

Example 9

After adding 4 g of N-(2-acryloyloxyethyl)-N-benzyl-N, N-dimethylammonium chloride (referred to as ABDMAC hereinafter) serving as a second polymerizable monomer and 1 g of distilled water to a bottle with a lid, the mixture was stirred by a stirrer to prepare an ABDMAC aqueous solution.

A coated test piece was obtained in the same manner as in Example 1, except that the ABDMAC aqueous solution was used instead of the MTMAC aqueous solution.

Comparative Example 1

An acrylic plate of 5 cm×5 cm with a thickness of 5 mm was provided for tests without coating.

Comparative Example 2

After mixing 14 g of BisMEPP and 6 g of NPG, both serving as a first polymerizable monomer, 0.04 g of (±)-camphorquinone, 0.1 g of ethyl p-dimethylaminobenzoate, 4 g of MTMAC serving as a second polymerizable monomer, and 6 g of NPG serving as a first polymerizable monomer were added. The resulting mixture was kneaded by an agate mortar and pestle until a homogeneous paste was formed. The paste was stirred by a planetary centrifugal mixer at 1,000 rpm for 10 minutes to prepare a coating liquid.

The coating liquid was placed into a spray container and spraying of the coating liquid was attempted, but clogging with the solids occurred. Therefore, the coating liquid was evenly spread on an acrylic plate of 5 cm×5 cm with a thickness of 5 mm using a round brush. The coating liquid was irradiated with light for 5 minutes by an LED emitting light having wavelengths of 365 nm to 465 nm at radiation intensity of 1,200 mW/cm 2 to polymerize the coating liquid, to thereby prepare a coated test piece.

Figure 2:
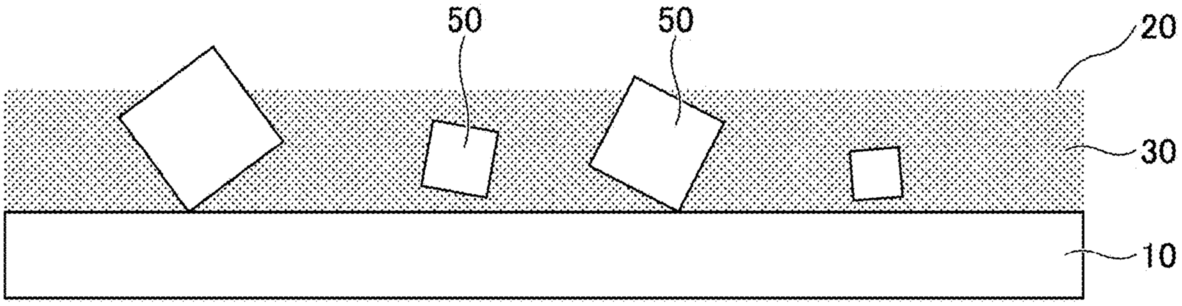
FIG. 2 is a schematic view illustrating a cross-section of the polymerizable composition of the comparative example.

FIG. 2 illustrates a state after evenly spraying the coating liquid onto the acrylic plate but before light irradiation by the LED in Comparative Example 2.

Comparative Example 3

A 35% ethanol solution of a compound represented by the following chemical formula was poured into a spray container, then the ethanol solution was evenly sprayed onto an acrylic plate of 5 cm×5 cm with a thickness of 10 mm. The sprayed coating liquid was left to stand for 30 minutes at room temperature to evaporate the ethanol, to thereby obtain a test piece coated with the following compound.

[Chem. 2]

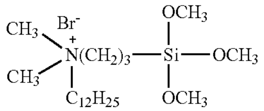

Next, the appearance of the test piece, antibacterial properties, retention of antibacterial properties, antiviral properties, and retention of antiviral properties were evaluated.

<Appearance of Test Piece>

A surface of a test piece having a diameter of 15 mm and a thickness of 1 mm, which was obtained by photopolymerization, was observed with naked eye to study the presence or absence of surface irregularities to evaluate the appearance of the test piece.

Figure 3:
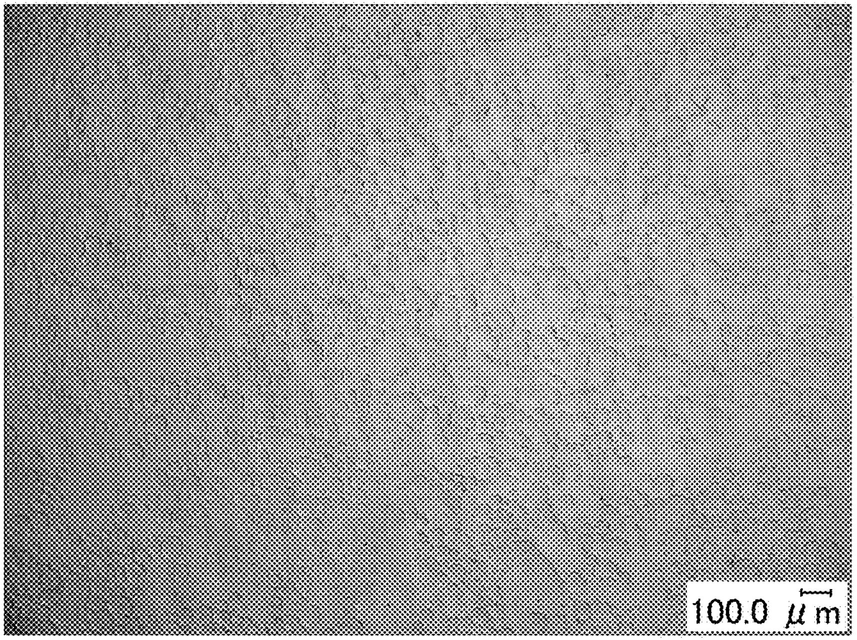
FIG. 3 is an optical microscopic photograph of the polymerizable composition of the present embodiment before curing.
Figure 4:
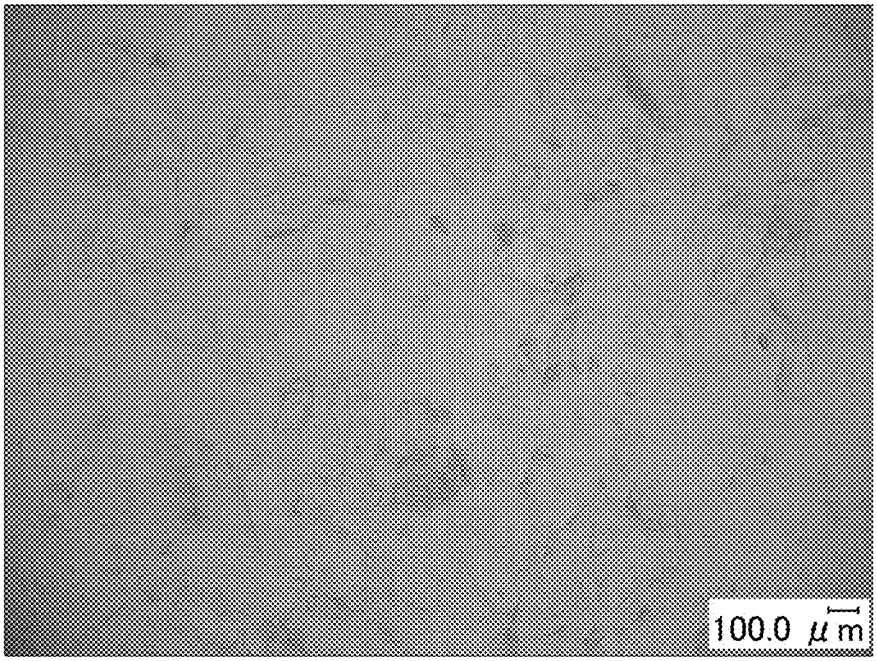
FIG. 4 is an optical microscopic photograph of the polymerizable composition of the comparative example before curing.
Figure 5:
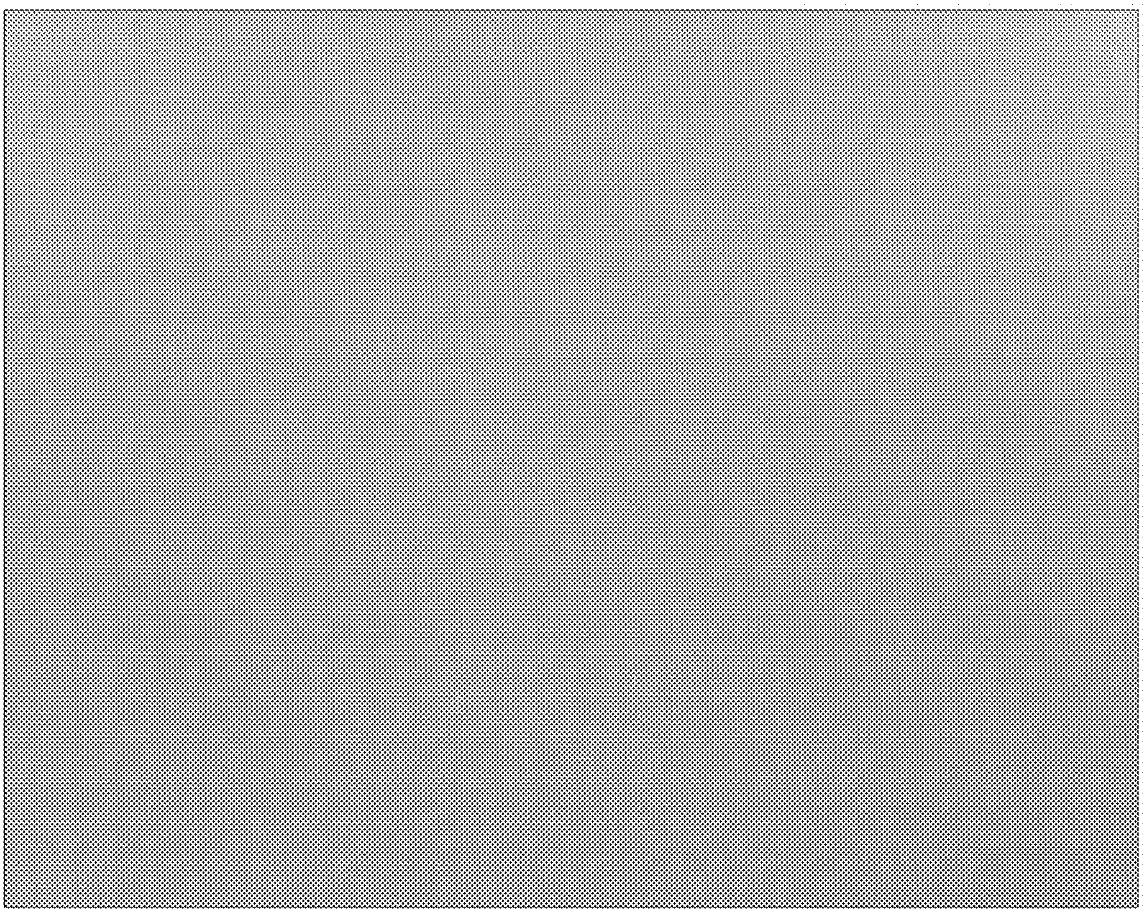
FIG. 5 is a photograph depicting the appearance of the polymerizable composition of the present embodiment after curing.
Figure 6:
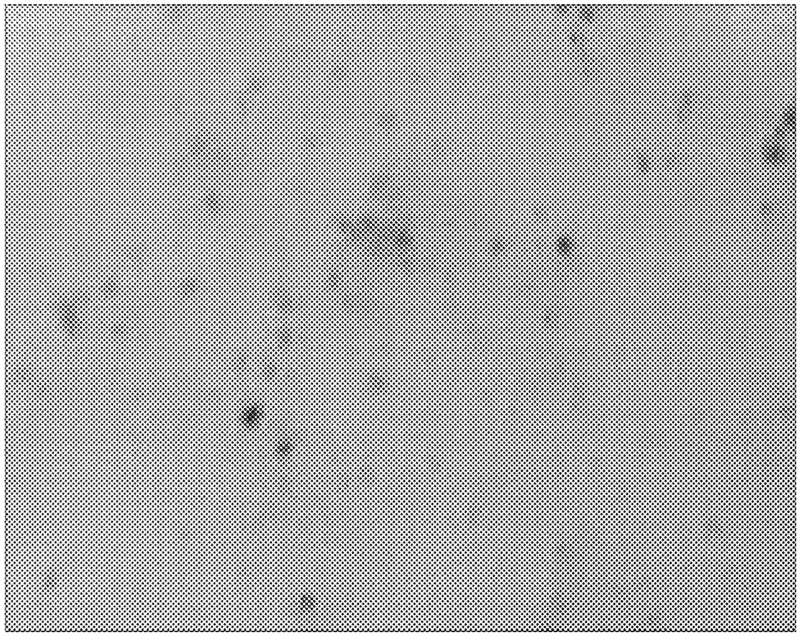
FIG. 6 is a photograph depicting the appearance of the polymerizable composition of the comparative example after curing.

FIG. 3 is an optical microscopic photograph depicting the state after evenly spraying the coating liquid onto the acrylic plate but before light irradiation with the LED in Example 1 with the magnification of ×100. FIG. 4 is an optical microscopic photograph depicting the state after evenly spraying the coating liquid onto the acrylic plate but before light irradiation with the LED in Comparative Example 2 with the magnification of ×100. FIG. 5 depicts the appearance of the test piece (after curing) of Example 1, and FIG. 6 depicts the appearance of the test piece (after curing) of Comparative Example 2.

The criteria for the appearance of the test piece are as follows.

Excellent: When there were no irregularities on the surface of the test piece and the appearance of the test piece was excellent.

Not good: When there were irregularities on the surface of the test piece and the appearance of the test piece was not good.

<Antibacterial Properties>

The antibacterial properties of the test piece were evaluated in accordance with JIS 2801:2012 Antibacterial products-Test for antibacterial activity and efficacy.

As a test bacteria, *S. mutans* was used.

Assuming that the antibacterial activity would be exhibited in more severe conditions, as a medium used for depositing the test bacteria on the test piece, a 1/10 BHI medium was used instead of a 1/500 broth medium.

The criteria for the antibacterial properties of the test piece are as follows.

Excellent: When the antibacterial activity value of the test piece was 2 or greater.

Not good: When the antibacterial activity value of the test piece was less than 2.

<Retention of Antibacterial Properties>

After immersing the test piece in a neutral phosphate buffer solution for one month, the antibacterial properties of the test piece were evaluated in the same manner as described above.

<Antiviral Properties>

The antiviral properties of the test piece were evaluated in accordance with ISO 21702 antiviral activity (non-fibrous product), using the Swine enteric coronavirus (Porcine epidemic diarrhea virus) as a test virus. The Swine enteric coronavirus (Porcine epidemic diarrhea virus) is an enveloped virus.

The criteria for the antiviral properties of the test piece are as follows.

Excellent: When the antiviral activity value of the test piece was 2 or greater.

Not good: When the antiviral activity value of the test piece was less than 2.

<Retention of Antiviral Properties>

After immersing the test piece in a neutral phosphate buffer solution for one month, the antiviral properties of the test piece were evaluated in the same manner as described above.

The evaluation results of the appearance of the test piece, antibacterial properties, retention of antibacterial properties, antiviral properties, and retention of antiviral properties are presented in Table 1.

TABLE 1

| | Ex. 1 | Ex. 2 | Ex. 3 | Ex. 4 | Ex. 5 | Ex. 6 |
|---|---|---|---|---|---|---|
| First polymerizable monomer | BisMEPP NPG | BisMEPP NPG | BisMEPP NPG | BisMEPP NPG | BisMEPP NPG | BisMEPP NPG |
| Second polymerizable monomer | MIMAC | MIMAC | MIMAC | MIMAC | MIMAC | MIMAC |
| First solvent | Water | Water | Water | Water (vapor) | Glycerin | Propylene glycol |
| Second solvent | — | — | — | — | — | — |
| Surfactant | — | — | — | — | — | SDS |
| Appearance | Excellent | Excellent | Excellent | Excellent | Excellent | Excellent |
| Antibacterial properties | Excellent | Excellent | Excellent | Excellent | Excellent | Excellent |
| Retention of antibacterial properties | Excellent | Excellent | Excellent | Excellent | Excellent | Excellent |
| Antiviral properties | Excellent | Excellent | Excellent | Excellent | Excellent | Excellent |
| Retention of antiviral properties | Excellent | Excellent | Excellent | Excellent | Excellent | Excellent |

| | Ex. 7 | Ex. 8 | Ex. 9 | Comp. Ex. 1 | Comp. Ex. 2 | Comp. Ex. 3 |
|---|---|---|---|---|---|---|
| First polymerizable monomer | BisMEPP NPG | BisMEPP NPG | BisMEPP NPG | — | BisMEPP NPG | [Chem. 2] 35%/ Ethanol 65% solution |
| Second polymerizable monomer | AATMAC | ATMAC | ABDMAC | — | MIMAC | |
| First solvent | Water | Water | Water | — | — | |
| Second solvent | — | — | — | — | — | |
| Surfactant | — | — | — | — | — | |
| Appearance | Excellent | Excellent | Excellent | Excellent | Not good | Excellent |
| Antibacterial properties | Excellent | Excellent | Excellent | Not good | Excellent | Excellent |
| Retention of antibacterial properties | Excellent | Excellent | Excellent | Not good | Not good | Not good |
| Antiviral properties | Excellent | Excellent | Excellent | Not good | Excellent | Excellent |
| Retention of antiviral properties | Excellent | Excellent | Excellent | Not good | Not good | Not good |

It can be understood from Table 1 that the coated test pieces of Examples 1 to 9 achieved all of the appearance, the antibacterial properties, the retention of antibacterial properties, the antiviral properties, and the retention of antiviral properties at high levels. As depicted in FIG. 1, for example, it was considered that, in Example 1, the solution 40, in which the second polymerizable monomer was dissolved in the first solvent, was homogeneously dispersed (diameters of droplets of the solution 40, in which the second polymerizable monomer was dissolved in the first solvent were small) in the first polymerizable monomer 30 in the polymerizable composition 20 fixed on the surface of the acrylic plate (article) 10, before curing.

Since coating was not performed on the test piece of Comparative Example 1, the test piece of Comparative Example 1 did not have antibacterial properties nor antiviral properties.

Since the test piece of Comparative Example 2 was produced without the first solvent, the appearance, the retention of antibacterial properties, and the retention of antiviral properties were all inadequate. As depicted in FIG. 2, for example, it was considered that, in Comparative Example 2, the second polymerizable monomer 50 was not homogeneously dispersed in the first polymerizable monomer 30 (particle diameters of the second polymerizable monomers 50 were coarse) in the polymerizable composition 20 fixed on the acrylic plate (article) 10 before curing.

It was assumed that the test piece of Comparative Example 3 exhibited antibacterial and antiviral properties temporarily because of the temporal binding of the compound to the glass surface by the silane treatment. As the silane treatment reversibly progresses through hydrolysis, both the antibacterial properties and the antiviral properties were not retained.

The embodiments of the invention have been described above, but the invention is not limited to the specific embodiments. It should be understood that the invention can be modified or altered in various ways within the scope of the invention, which is defined in the scope of claims.

The present application claims priority to Japanese Patent Application No. 2021-062314, filed Mar. 31, 2021, the contents of which are incorporated herein by reference in their entirety.

DESCRIPTION OF SYMBOLS

10 acrylic plate (article)
20 polymerizable composition
30 first polymerizable monomer
40 solution in which a second polymerizable monomer is dissolved in a first solvent
50 second polymerizable monomer

5. The method of coating the article according to claim 1, wherein the applying is spraying, jetting, or spreading.

6. The method of coating the article according to claim 5, wherein the second polymerizable monomer includes a functional group exhibiting either antibacterial properties or antiviral properties, or both.

7. The method of coating the article according to claim 1, wherein the second polymerizable monomer includes a functional group exhibiting either antibacterial properties or antiviral properties, or both.

8. The method of coating the article according to claim 1, wherein the second polymerizable monomer is at least one compound selected from a group consisting of 2-(methacryloyloxy)ethyltrimethylammonium chloride, (3-acrylamidepropyl)trimethylammonium chloride, N-(2-acryloyloxyethyl)-N-benzyl-N,N-dimethylammonium chloride, a dimethylaminopropyl acrylamide methyl chloride quaternary salt, a dimethylaminoethyl acrylate methyl chloride quaternary salt, a dimethylaminoethyl acrylate benzyl chloride quaternary salt, diallyldimethylammonium chloride, diallyldiethylammonium chloride, and a compound represented by a following chemical formula:

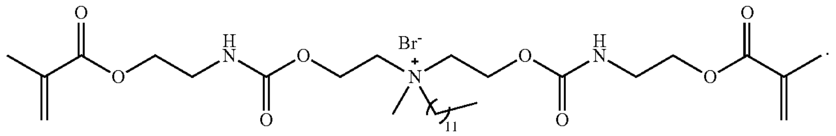

The invention claimed is:

1. A method of coating an article, the method comprising:
obtaining a polymerizable composition;
applying the polymerizable composition onto the article; and
polymerizing the polymerizable composition applied onto the article,
wherein the polymerizable composition includes a first polymerizable monomer and a solution dispersed in the first polymerizable monomer, the solution including a first solvent and a second polymerizable monomer dissolved in the first solvent,
wherein the first polymerizable monomer is a liquid, and the second polymerizable monomer is a solid, and
wherein the obtaining of the polymerizable composition includes: dissolving, in a second solvent, at least part of the first polymerizable monomer and the second polymerizable monomer to prepare a dissolution solution; removing the second solvent from the dissolution solution to prepare a dispersion liquid, in which the second polymerizable monomer is dispersed in the at least part of the first polymerizable monomer; and mixing the dispersion liquid, the first solvent, and a remaining part of the first polymerizable monomer.

2. The method of coating the article according to claim 1, wherein the polymerizing includes performing light irradiation on the polymerizable composition applied onto the article.

3. The method of coating the article according to claim 2, wherein the applying is spraying, jetting, or spreading.

4. The method of coating the article according to claim 2, wherein the second polymerizable monomer includes a functional group exhibiting either antibacterial properties or antiviral properties, or both.

9. The method of coating the article according to claim 1, wherein the first polymerizable monomer is a polyfunctional (meth)acrylate including two or more (meth) acryloyloxy groups, and
wherein the second polymerizable monomer is at least one selected from a group consisting of 2-(methacryloyloxy)ethyltrimethylammonium chloride, (3-acrylamidepropyl)trimethylammonium chloride, (2-(acryloyloxy)ethyl)trimethylammonium chloride, and N-(2-acryloyloxyethyl)-N-benzyl-N,N-dimethylammonium chloride.

10. The method of coating the article according to claim 1,
wherein the article includes metals, ceramics, wood, or fibers.

11. The method of coating the article according to claim 1,
wherein the article includes metals, ceramics, or wood.

12. A method for coating an article, the method comprising:
obtaining a polymerizable composition;
using the polymerizable composition to coat the article,
wherein the polymerizable composition includes a first polymerizable monomer and a solution dispersed in the first polymerizable monomer, the solution including a first solvent and a second polymerizable monomer dissolved in the first solvent,
wherein the first polymerizable monomer is a liquid, and the second polymerizable monomer is a solid, and
wherein the obtaining of the polymerizable composition includes: dissolving at least part of the first polymerizable monomer and the second polymerizable monomer in a second solvent to prepare a dissolution solution; removing the second solvent from the dissolution solution to prepare a dispersion liquid, in which the second polymerizable monomer is dispersed in the at least part of the first polymerizable monomer; and mixing the dispersion liquid, the first solvent, and a remaining part of the first polymerizable monomer.

13. The method according to claim 12, wherein the second polymerizable monomer includes a functional group exhibiting either antibacterial properties or antiviral properties, or both.

* * * * *